3,347,915
PRODUCTION OF UREA
Giacomo Fauser, Novara, Italy, assignor to Montecatini Società Generale per l'Industria Mineraria e Chimica, Milan, Italy, a corporation of Italy
Filed July 12, 1962, Ser. No. 209,372
Claims priority, application Italy, July 14, 1961, 13,110/61
2 Claims. (Cl. 260—555)

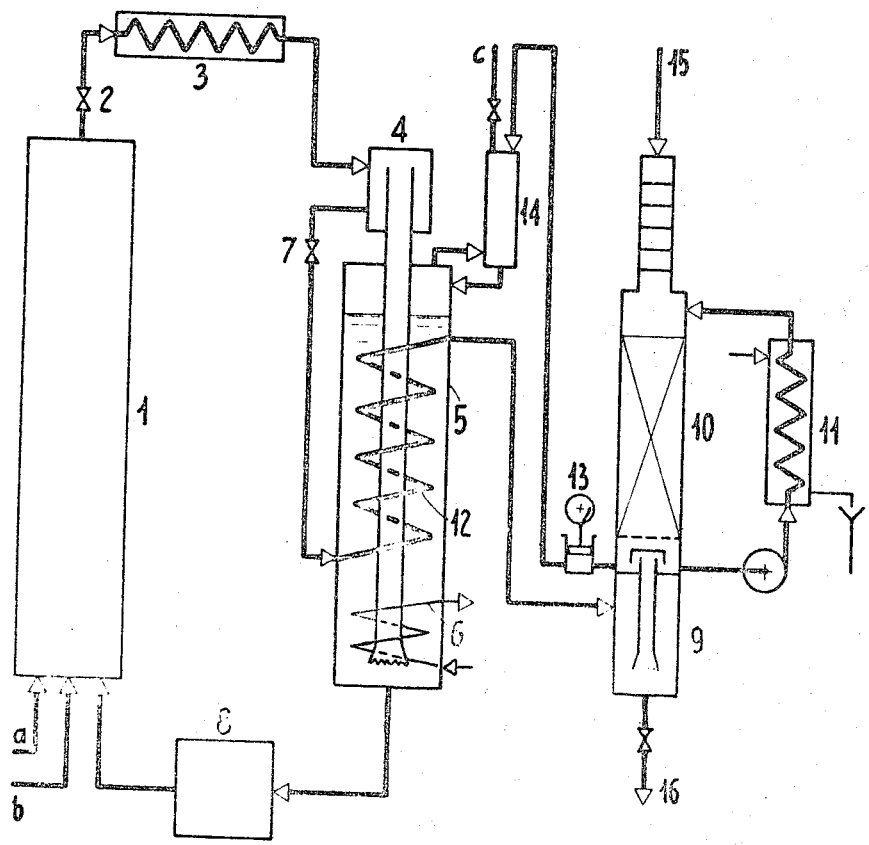

It is known that the synthesis of urea is obtained by compression of ammonia and carbon dioxide into an autoclave maintained at a temperature higher than 150° C. and at a pressure of about 200 atm., and that only about 40% of the reactants is converted into urea while the remainder remains under the form of carbamate.

There is also known a method for converting into urea the residual carbamate; according to this method the operation is carried out in two distinct stages: in the first stage the carbamate is separated from urea by distillation at a pressure of about 20 atm., and, after condensation, pumped back as a liquid into the autoclave.

In this stage about 75% of the carbamate is recycled while the residual 25% remains in the aqueous urea solution. This solution is then redistilled at atmospheric pressure and the residual carbamate is recondensed and pumped back into the autoclave so that substantially all of the reactants are converted into urea.

It is apparent that the twofold distillation of the carbamate carried out in two distinct apparatus, requires a remarkable steam consumption, and more complicated apparatus equipment for the recycling of the residual carbamate.

This invention relates to a process for the production of urea in such conditions as to lower remarkably the steam consumption which is an important factor in the cost of operation.

The invention essentially consists in carrying out the carbamate condensation in the first stage of recovery at a temperature sufficiently high to make possible the utilisation of the available heat for the distilling of the carbamate that is recovered in the second stage. To that end, it is necessary to increase the pressure conveniently, and then the condensation temperature of the carbamate in the first stage, so as to be able to effect the indirect heat exchange between the solution of the first and the second stages with the aid of a comparatively modest transfer surface.

One embodiment of the invention is represented by way of example, without limitation, in the accompanying drawing. Ammonia and carbon dioxide, coming from pipes $a$ and $b$, are introduced into the autoclave 1 under a pressure of 200 atm. The solution of urea and carbamate which is discharged by valve 2 at a pressure of about 35 absolute atm., is distilled in the steam heater 3. In separator 4 is collected the liquid phase consisting of an aqueous solution of urea and carbamate, while the vapour phase consisting of ammonia, carbon dioxide and water, is condensed in the apparatus 5 below which is maintained constantly at a temperature of 135° C. and at a pressure of 35 abs.atm. The heat which is released during the carbamate condensation is yielded through the exchanger 12 to the solution coming from separator 4 which is decompressed by means of valve 7 to a pressure of 1–3 abs.atm. At this pressure, the residual carbamate contained in the solution distils at a temperature below 110° C.; there is, therefore, the possibility of effecting an efficient heat exchange by carrying out the distillation of the carbamate present in the second stage at the expense of the heat released from the carbamate vapours that condense in the first stage.

It is pointed out that this quantity of heat amounts to almost 600,000 kilocalories per ton of urea while the heat necessary for the distillation of the carbamate in the second stage of the operation amounts to about 320,000 kilocalories only; therefore, it is necessary to provide a supplementary heat exchanger 6 adapted to dispose of the excess of heat.

It is possible, of course, to utilize such heat to conveniently preheat the carbon dioxide and ammonia before their introduction into the autoclave. The carbamate solution condensed in the first stage is recycled to autoclave 1 by means of pump 8 while the solution distilled in the heat exchanger 12 is sent into the separator 9. The substantially carbamate-free aqueous urea solution is discharged by the valve 16, and the carbamate vapours are condensed in the column 10 above. The heat of condensation is removed in the cooler 11 at a temperature of about 30° C. A small amount of water is fed into the head of condensation column 15 to secure a total absorption of the ammonia present.

The solution of carbon dioxide and ammonia collected at the base of absorption column 10 is sent back by means of pump 13 into the wash column 14 wherein the ammonia contained in the inert gases is recovered and then joined with the carbamate recovered in the first stage. The inert gases are discharged from wash column 14 by means of valve C.

The present invention allows, in addition to a remarkable saving of steam as compared with known methods, greater simplicity of apparatus equipment with lower installation and operating cost, and lowers the quantity of cooling water required.

I claim:
1. In the process of producing urea from $NH_3$ and $CO_2$, wherein the unconverted reactants, present in the aqueous urea solution leaving the urea reactor, are separated as vapors from the aqueous urea solution by a two stage distillation and recycled into said reactor as an aqueous carbamate solution, the improvement which comprises
   (a) carrying out the first distillation stage at a pressure from 25 to 50 absolute atmospheres and the second distillation stage at a pressure from 1 to 3 absolute atmospheres,
   (b) absorbing the vapors separated in the first distillation stage in the aqueous solution of vapors separated in the second distillation stage, and
   (c) utilizing the heat of absorption of (b) in the second distillation stage.

2. In the process of producing urea from $NH_3$ and $CO_2$, wherein the unconverted reactants, present in the aqueous urea solution leaving the urea reactor, are separated as vapors from the aqueous urea solution by a two stage distillation and recycled into said reactor as an aqueous carbamate solution, the improvement which comprises
   (a) carrying out the first distilation stage at a pressure from 30 to 50 absolute atmospheres and the second distillation stage at a pressure from 1 to 3 absolute atmospheres,
   (b) absorbing the vapors separated in the first distillation stage in the aqueous solution of vapors separated in the second distillation stage, and
   (c) utilizing the heat of absorption of (b) by indirect heat exchange to carry out the second distillation stage.

References Cited

UNITED STATES PATENTS 2,848,493   8/1958   Dewling et al. _____ 260—555
3,137,725   6/1964   Cook et al. _____ 260—555

(Other references on following page)

FOREIGN PATENTS 883,509 11/1961 Great Britain.

OTHER REFERENCES

Kirk-Othmer: Ency. Chem. Tech, vol. 5 (1950), pages 940-2.

Kume: Petroleum Refiner, vol. 39, No. 3 (1960), pages 200-01.

HENRY R. JILES, *Primary Examiner.*

NICHOLAS RIZZO, ALEX MAZEL, *Examiners.*